Sept. 13, 1932.  G. F. WILSON ET AL  1,876,815
APPARATUS FOR WRAPPING TIRES
Filed June 26, 1929  2 Sheets-Sheet 1
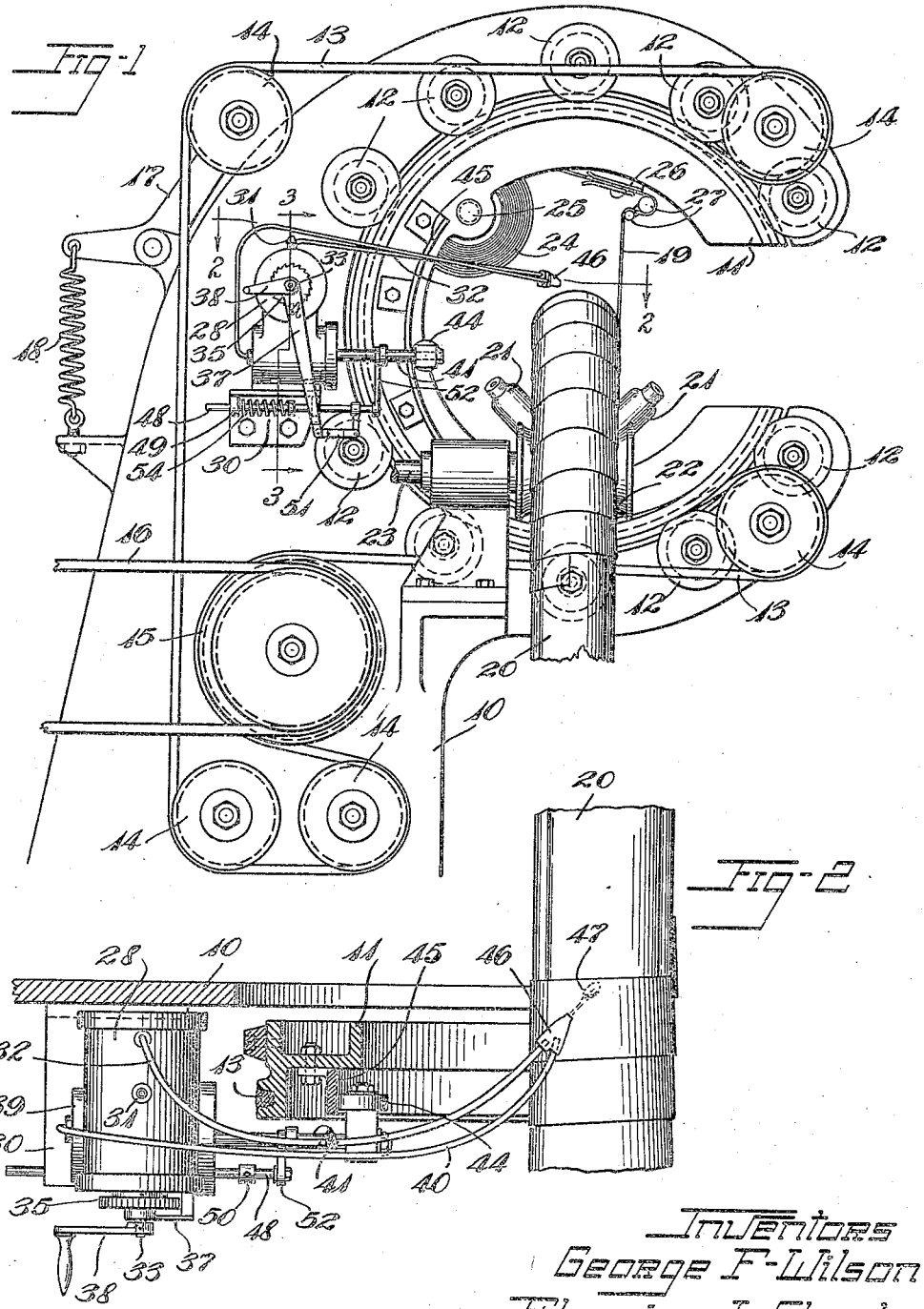
Inventors
George F. Wilson
Florain J. Shook
By Eakin & Avery
Attys.

Sept. 13, 1932.    G. F. WILSON ET AL    1,876,815
APPARATUS FOR WRAPPING TIRES
Filed June 26, 1929    2 Sheets-Sheet 2
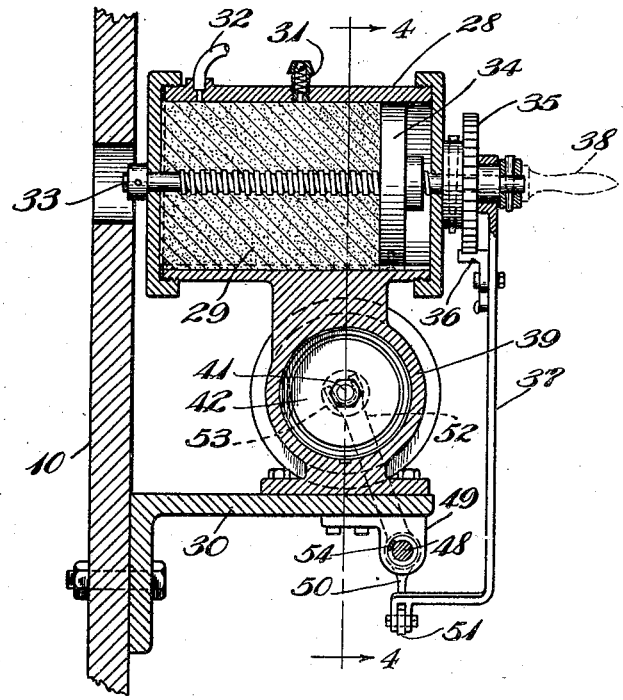
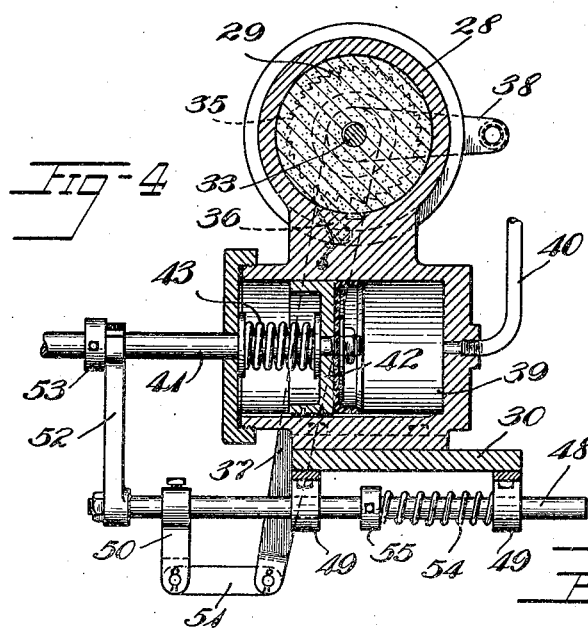
Inventors
George F. Wilson
Florain J. Shook
By Eakin & Avery
Attys Patented Sept. 13, 1932

1,876,815

UNITED STATES PATENT OFFICE

GEORGE F. WILSON AND FLORAIN J. SHOOK, OF AKRON, OHIO, ASSIGNORS TO THE B. F. GOODRICH COMPANY, OF NEW YORK, N. Y., A CORPORATION OF NEW YORK

APPARATUS FOR WRAPPING TIRES

Application filed June 26, 1929. Serial No. 373,884.

This invention relates to apparatus for wrapping tires, and more especially to mechanism for applying to a tire a wrapper comprising adhesively united, overlapping helical convolutions of a single strip of wrapping material such as paper.

In the manufacture of pneumatic tires it is customary to apply a covering to the finished tires primarily to protect them from air and sunlight until such time as they are to be put into service, and such covering usually comprises a paper wrapper applied to the tire in strip form and disposed in overlapped helical convolutions. To prevent the convolutions of the wrapper from spreading apart at the outer periphery of the tire where they overlap the least, and to prevent scattering of pieces of the wrapper when it is intentionally removed from the tire, it is common practice to apply a gummed strip circumferentially of the tire at the outer periphery thereof to hold the convolutions of the wrapper in fixed relation to each other. Other expedients previously used include applying adhesive continuously to one margin of the wrapping material, or moistening the margin of a previously gummed strip.

The chief objects of this invention are to obviate the use of a gummed strip for holding the respective convolutions of a tire wrapper in place on a tire and to obviate the use of a previously gummed wrapper.

Other objects are to provide simple, automatic, and economical apparatus for securely wrapping tires or the like and to provide a wrapping machine in which the adhesive-applying mechanism will not be required to be mounted on the rotary shuttle.

Of the accompanying drawings:

Fig. 1 is a front elevation of apparatus embodying and adapted to carry out our invention in its preferred form, a part thereof being broken away.

Fig. 2 is a section on line 2—2 of Fig. 1.
Fig. 3 is a section on line 3—3 of Fig. 1.
Fig. 4 is a section on line 4—4 of Fig. 3.

Referring to Fig. 1 of the drawings, 10 is the frame of a tire wrapping machine, and 11 is a rotary shuttle peripherally journaled thereon within an arcuate series of grooved rollers 12, 12, said shuttle being driven by an endless belt 13 which is mounted upon a series of idler sheaves 14 and arranged with a reentrant loop which engages a portion of the periphery of the shuttle 11, and with a reentrant loop which passes around a driving pulley 15, the latter being driven by a belt 16 from a suitable source of power (not shown). One of the idler sheaves 14 is mounted upon one arm of a bell-crank 17, the other arm of which is connected to the frame by a tension spring 18 for keeping the belt 13 normally in taut condition.

The wrapping machine is adapted to apply a tape or strip of paper 19 to a tire 20 by wrapping the strip about the tire in a succession of overlapping helical convolutions as the tire is rotated upon its own axis. The tire is supported from its inner periphery upon a pair of obliquely disposed rollers 21, 21, which urge the bead portions of the tire toward each other to close the gap therebetween in the region where the paper strip is being applied to the tire, and a pair of grooved rollers, such as the roller 22, at least one of which is driven, as by a drive shaft 23 connected with a suitable source of power (not shown) for rotating the tire. The machine is provided with other grooved rollers (not shown) for holding the tire in frictional engagement with the aforementioned rollers, as is common practice in other well known tire wrapping machines of this general design.

The tape or paper strip 19 is drawn from a supply roll 24 of the same, the supply roll being carried on a spindle 25 extending laterally from the rotary shuttle, and adapted yieldingly to resist the unwinding of the supply roll. A folder 26 provided with a pair of guide rollers 27, 27 is mounted upon the rotary shuttle 11 adjacent the spindle 25 and is adapted progressively to fold a narrow marginal portion of the strip 19 upon itself as the strip is drawn from the supply roll 24 onto the tire 20. The spindle 25, folder 26 and guide rollers 27 impart the necessary tension to the strip 19 to wrap the same tightly about the tire.

To adhere successive convolutions of the strip 19 to each other, we apply a suitable quantity of paste or other suitable adhesive to those marginal portions of successive convolutions which are overlaid by succeeding convolutions of the strip, and such applications of adhesive are made in the intervals after a convolution is laid and before the succeeding convolution is overlaid thereupon.

For applying the adhesive at determinate intervals to the tire wrappings as described, a cylindrical reservoir or receptacle 28 for a supply mass 29 of the adhesive is mounted upon a bracket 30 secured to the machine frame 10 adjacent the rotary shuttle 11. The receptacle 28 is provided with a valved inlet or filling port 31 and an outlet or delivery pipe 32. Journaled axially of the receptacle 28 is a threaded shaft 33 and mounted thereon within the receptacle, is a piston 34 adapted to be moved axially by angular movement of the shaft 33 to extrude the viscous adhesive 29 through the pipe 32. One end of the shaft 33 extending beyond the end-wall of the receptacle has mounted thereon a ratchet 35 engaged by a spring-pressed pawl 36 mounted upon a downwardly extending lever 37 the upper end of which is journaled upon said shaft 33. Thus oscillation of the lever 37 will extrude a determinate quantity of adhesive from the pipe 32. A hand-lever 38 is mounted upon the end of the shaft 33 for manually rotating the same, upon occasion, such as to retract the piston 34 preparatory to filling the receptacle with adhesive, and to fill the pipe 32 with adhesive after the receptacle is initially filled.

Preferably cast integral with the receptacle 28 and having its axis disposed in a plane transverse thereto is a pump comprising a cylinder 39 having an inlet and outlet pipe 40 entering one end thereof. Extending through the opposite end of the cylinder 39 is a piston rod 41 upon which is mounted a cylinder piston 42, and a compression spring 43 is mounted upon the piston rod 41 between the piston 42 and the end wall of the cylinder. Reciprocation of the piston rod 41 draws air into the cylinder 39 through the pipe 40 and then ejects it through the same pipe, and for so reciprocating said piston rod, the outer end thereof is provided with a cam-roller 44 which extends radially of said piston rod into the orbit of an elongate arcuate cam 45 mounted upon the front face of the rotary shuttle 11 and disposed eccentrically thereof.

The arrangement is such that with each revolution of the shuttle 11 the cam 45 engages the cam-roller 44 and retracts the piston 42 in its cylinder against the force of the spring 43 to draw air into the cylinder 39 through the pipe 40. As the cam passes out of engagement with the cam-roller the spring 43 quickly projects the piston 42 to the opposite end of the cylinder to eject the air therefrom through the same pipe 40. The pipe 40 and the pipe 32 have their ends mounted in a common nozzle 46 which is positioned adjacent the tire 20 in the region where the strip 19 is applied thereto, and the air ejected through the pipe 40 expels from the nozzle 46 the adhesive delivered thereto by the pipe 32, as is clearly shown at 47, Fig. 2. The cam 45 is so positioned upon the shuttle 11 with relation to the strip feeding means that the charge of adhesive 47 is ejected from the nozzle 46 onto the margin of the wrapper thereon immediately before the succeeding convolution of the wrapper is applied to the tire.

The piston 34 is operated in timed relation to the piston 42 so that a measured charge of adhesive is in the nozzle 46 before the air from the cylinder 39 is ejected therethrough. For so operating said pistons in timed relation, a push-rod 48 is slidably journaled in a pair of brackets 49, 49 secured to the underside of the bracket 30, and an arm 50 mounted on said push-rod and extending downwardly therefrom is connected by a link 51 with the free end of the lever 37. An arm 52 mounted upon the push-rod 48 extends upwardly therefrom and has its free end forked to engage the piston rod 41 behind a collar 53 on the latter. A light compression spring 54 is mounted upon the push-rod 48, between a collar 55 thereon and one of its brackets 49, in such a manner as weakly to oppose the spring 43.

The arrangement is such that as the cam 45 engages the cam-roller 44 and thereby retracts the piston rod 41 against the pressure of the spring 43 to draw air into the cylinder 39, the spring 54 expands and moves the push-rod 48 axially, to the left as viewed in Fig. 4, and, through the arm 50, link 51, lever 37, pawl 36 and ratchet 35, turns the shaft 33 angularly and moves the piston 34 in the cylinder 28 a determinate distance to force a quantity of adhesive 29 through the pipe 32 into the nozzle 46. As the movement of the cam 45 carries it out of engagement with the cam-roller 45, the spring 43 moves the piston 42 to the opposite end of the cylinder 39 to eject the air therefrom through the pipe 40 and thereby to effect the ejection of the adhesive in the nozzle 46 as hereinbefore described. In the movement of the piston rod 41 during the ejective movement of the piston 42, the collar 53 on the piston rod engages the forked arm 52 on the push-rod 48 and forces the latter toward the right as viewed in Fig. 4 against the pressure of the weak spring 54, and thereby throws the lever 37 to the right as viewed in the same figure during which movement the pawl 36 is drawn backward over the ratchet 35 and there is no resulting movement of the shaft 33.

The operation of our improved wrapping machine will be apparent from the foregoing description of the apparatus. The operation is substantially automatic, requiring only that the operator mount the tire, start the driving mechanism and start the leading end of the tape 19 onto the tire, and after the tire is completely wrapped, sever the tape 19 and remove the tire. The adhesive-applying mechanism automatically deposits a measured quantity of paste upon the wrapper at regular determinate intervals in positions which are overlaid by the succeeding convolutions of the wrapper, so that no additional means, such as a peripheral strip adhered to the wrapper, is required to prevent separation of the adjacent convolutions of the wrapper.

Our invention may be modified within the scope of the appended claims, and we do not limit our claims wholly to the specific construction or exact procedure described.

We claim:

1. In apparatus for wrapping annular articles the combination of means for enclosing the article in a succession of overlapped convolutions of wrapping material, and means for successively applying adhesive to the respective convolutions after they are on the article.

2. In apparatus for wrapping tires, the combination of means for applying a succession of overlapped helical convolutions of wrapping material to a tire, and means for projecting fluid between the overlapped convolutions, from a point adjacent thereto, as they are applied to the tire.

3. In apparatus for wrapping tires, the combination of means for applying successive overlapped convolutions of wrapping material to a tire, and means for applying adhesive locally to the convolutions of wrapping material on the tire at determinate time intervals as the tire is so wrapped.

4. In apparatus for wrapping tires, the combination of means for applying overlapping helical convolutions of wrapping material to a tire, means for periodically positioning charges of adhesive adjacent the tire, and means for projecting the charges successively onto the wrapper at points where they will be disposed between overlapping convolutions.

5. Apparatus as defined in claim 4 in which the adhesive-positioning means is actuated by the adhesive-projecting means in timed relation thereto.

6. In tire wrapping apparatus, the combination of a stationary frame, means mounted thereon for supporting and rotating a tire, a rotary shuttle for applying a strip of wrapping material to said tire, and mechanism mounted upon a stationary part of the apparatus for projecting adhesive on to said strip of material.

7. Apparatus as defined in claim 6 in which the adhesive-projecting mechanism is actuated in timed relation to the rotation of the shuttle.

8. In tire-wrapping apparatus, the combination of means for supporting a tire and rotating it on its own axis, a rotary shuttle for applying a wrapper to said tire, an adhesive-dispensing device spaced from the wrapper and adapted to project adhesive thereunto, and means on said shuttle for actuating the adhesive-dispensing device.

9. In tire-wrapping apparatus the combination of means for mounting and rotating a tire, a rotary shuttle for applying a wrapper thereto, a nozzle positioned adjacent the tire, means for feeding a charge of adhesive to said nozzle, and means actuated by the shuttle for impelling said charge onto the tire-wrapper.

10. In a tire wrapping machine the combination with tire wrapping mechanism of a reservoir, means for dispensing a determinate quantity of adhesive material therefrom, and means for projecting the dispensed material onto a wrapping applied by said mechanism.

11. In a wrapping machine the combination with article-wrapping mechanism of a reservoir for viscous adhesive material, means for extruding a determinate quantity of said material, and means actuated in timed relation to the extruding means for hydraulically projecting the extruded material onto a wrapping applied by said mechanism.

12. In a wrapping machine the combination with article-wrapping mechanism of a reservoir for adhesive viscous material, said reservoir having an outlet connected with a nozzle, an air pump connected to said nozzle, means for intermittently dispensing material from said reservoir to said nozzle, and means for actuating said air pump in alternation with said dispensing means to project the dispensed material onto an article being wrapped by said mechanism.

13. Apparatus as defined in claim 12 in which the dispensing means and pump-actuating means are interconnected and actuated by a single power member.

14. In tire wrapping apparatus, the combination of a stationary frame, means mounted thereon for supporting and rotating a tire, a rotary shuttle for applying a strip of wrapping material to said tire, and mechanism mounted upon a stationary part of the apparatus for applying adhesive to said strip of material, said adhesive-applying mechanism being adapted to be actuated in timed relation to the rotation of the shuttle.

In witness whereof we have hereunto set our hands this 22nd day of June, 1929.

GEORGE F. WILSON.
FLORAIN J. SHOOK.